June 23, 1970 R. K. CHAMBERLAIN 3,516,522

LIQUID COOLED WHEEL AND BRAKE ASSEMBLY

Filed Aug. 14, 1968 5 Sheets-Sheet 1

INVENTOR.
RICHARD K. CHAMBERLAIN

BY *Harry F. Pepper, Jr.*

ATTORNEY

June 23, 1970  R. K. CHAMBERLAIN  3,516,522
LIQUID COOLED WHEEL AND BRAKE ASSEMBLY
Filed Aug. 14, 1968  5 Sheets-Sheet 2

INVENTOR.
RICHARD K. CHAMBERLAIN
BY *Harry F. Pepper, Jr.*
ATTORNEY

United States Patent Office 3,516,522
Patented June 23, 1970

---

3,516,522
LIQUID COOLED WHEEL AND BRAKE ASSEMBLY
Richard K. Chamberlain, Stow, Ohio, assignor to The General Tire & Rubber Company, a corporation of Ohio
Filed Aug. 14, 1968, Ser. No. 752,616
Int. Cl. F16d 65/84
U.S. Cl. 188—264                                    4 Claims

---

ABSTRACT OF THE DISCLOSURE

Disclosed is a liquid cooled wheel and disc-brake assembly wherein the brake rotor forms a part of the wheel structure. The rotor, made of a good heat conducting metal, contains a closed "heat-sink" chamber with controlled fluid outlet means operable to release fluid from the chamber when fluid pressure within reaches a predetermined value. The chamber is provided with annular heat transfer fins extending between the chamber side walls, which in effect divide the chamber into a plurality of concentric sub-chambers. Such a design provides a maximum amount of metal-liquid contact within the chamber so that heat developed through braking is rapidly transferred to the fluid in the chamber.

---

BACKGROUND OF THE INVENTION

The invention relates to a liquid cooled wheel and disc-brake assemblies and more particularly to such assemblies where the brake rotor members contain closed liquid chambers where liquid contained therein acts as a "heat-sink" for heat developed by braking action.

Braking of a rotating wheel results in a conversion of mechanical energy to heat energy. Depending upon the amount of mechanical energy converted, the heat developed at the braking interface may cause the wheel and brake components to reach dangerously high temperatures at which the brake, or any structure in heat conducting relationship with the brake, may be adversely affected. In most cases, the braking action required for light vehicles, such as passenger cars or small trucks, does not produce a temperature which would be considered critical in relation to the structure involved. However, there are situations where the braking action applied to a wheel will result in such a high energy conversion that this critical temperature may be reached. For example, when braking an aircraft upon landing, the wheels and brakes, as well as the tires mounted on the wheels, may reach dangerously high temperatures. Also, high temperatures can be involved during braking of large trucks and other heavy vehicles. It is desirable in these situations to provide for effective removal of some of the heat developed from the wheel and brake structure.

One of the more popular methods for maintaining the temperature of a brake and wheel below a critical value is to remove the heat from the structure involved through the use of a cooling fluid system. Air and water are the more common fluids used, however, many other fluids suitable for such purposes have also been employed.

There are air cooled brakes in which cooling air circulates throughout various strategic portions of the wheel and/or brake structure. This type of system requires the use of a great volume of air as well as, in some cases, air circulation pumps.

There are many systems using water as a coolant in which water circulates throughout the brake and/or wheel. There are also water cooling systems wherein the liquid is sprayed directly onto the brake structure. These cooling systems also require a great amount of cooling fluid, and the former type requires circulation pumps.

Another method of cooling with fluid is to provide a closed chamber adjacent the brake rotor or stator which chamber contains a predetermined volume of liquid. The liquid acts as a "heat-sink." Here, the heat developed at the braking interface will be conducted through the structure involved into the liquid contained in the chamber. In this type of cooling system a pressure relief valve is normally associated with the chamber so that, in the event the amount of heat absorbed by the liquid causes dangerously high fluid pressures within the chamber, some of the fluid may be released to the atmosphere. Normally, no pumps are required in this type of system, nor is any unusually large amount of liquid needed. The main drawback with this type of cooling ssytem is that the total area of contact between liquid and metal is usually not great enough to allow a sufficiently rapid transfer of heat from the wheel and brake structure, in order to maintain the temperature of the wheel and brake assembly below a critical value. Depending on where the liquid chamber is located, the amount of liquid-metal contact is usually limited by the size of the chamber. Usually, the larger the chamber, the more liquid-metal contact.

In recent years, the trend has been to design wheel and brake assemblies which are less cumbersome and more compact. The increasing popularity of the disc-type brake is evidence of this trend. Use of the enclosed liquid "heat-sink" to cool a brake and wheel structure has appeared to decrease due to emphasis on more compact brake assemblies.

Recently, solid "heat-sink" materials have been developed for use in brakes which lend themselves to a more compact design. For an example of a compact brake and wheel assembly using a solid "heat-sink" material, reference is made to U.S. Pat. No. 3,306,401. While these types of brakes are usually efficient, it has been found that the solid "heat-sink" materials used significantly add to manufacturing costs.

In keeping with industry's emphasis on more compact brake units, sometimes wheels are designed with disc brakes, where the brake rotor is, in fact, part of the wheel itself. To use some type of liquid "heat-sink" chamber as is commonly known today within such a brake rotor would, in most cases, be virtually impossible. A basic redesigning of the structure of the enclosed chamber would be necessary.

SUMMARY OF THE INVENTION

It is an object of the present invention to provide a high-energy wheel and disc-brake assembly provided with an effective cooling system, which assembly is strong, light-weight and very compact.

It is another object of the present invention to provide a wheel and disc-brake assembly wherein the brake rotor is designed to both form a part of the wheel and contain an effective fluid "heat-sink" chamber.

It is a further object of the present invention to provide a disc-brake having a rotor member which contains a closed fluid chamber which is designed to allow sufficiently rapid transfer of heat from the braking surface of the rotor into the fluid chamber, so that all structural components in heat conducting relationship with the brake are maintained below a predetermined critical temperature.

It is still another object of the present invention to provide a combination wheel and brake unit in which the wheel and brake unit is prevented from reaching a critical temperature due to a specially designed liquid chamber carried within the unit.

The invention is directed to a wheel and disc-brake assembly particularly useful in high energy braking situations. The assembly is compact, by virtue of the fact that the brake rotor is formed as a part of the wheel, and is actually the structural connecting member between the rim and hub portions of the wheel. The rotor, rim and hub which make up the rotatable wheel are made of a light-weight metal having a high heat conductance, as for example, aluminum or magnesium. Within the brake rotor is a specially designed liquid chamber having a plurality of radially spaced, annular fins extending from the side walls of the chamber across its axial length. A predetermined volume of liquid may be maintained within the chamber and this liquid will function as a heat-sink to absorb the heat developed at the braking surface. Depending upon the situation, a portion of the liquid within the chamber may vaporize. Hot fluid in the chamber will cause a pressure increase therein. Upon reaching a predetermined chamber pressure, a pressure responsive outlet opens, to allow release of fluid to the atmosphere.

DESCRIPTION OF THE PREFERRED EMBODIMENTS

The preferred embodiments illustrated in FIGS. 1 through 14 show the invention as it may be adapted for use on aircraft and where the wheel is rotatably mounted on a fixed axle. While the description which follows relates to this general type of wheel assembly, it should be understood that the invention is equally adaptable as a wheel rotatable with a driven axle or spindle. As the following description proceeds, it will become obvious that by simple structural modifications, the invention can be used effectively in most high energy braking situations.

Figure 1:
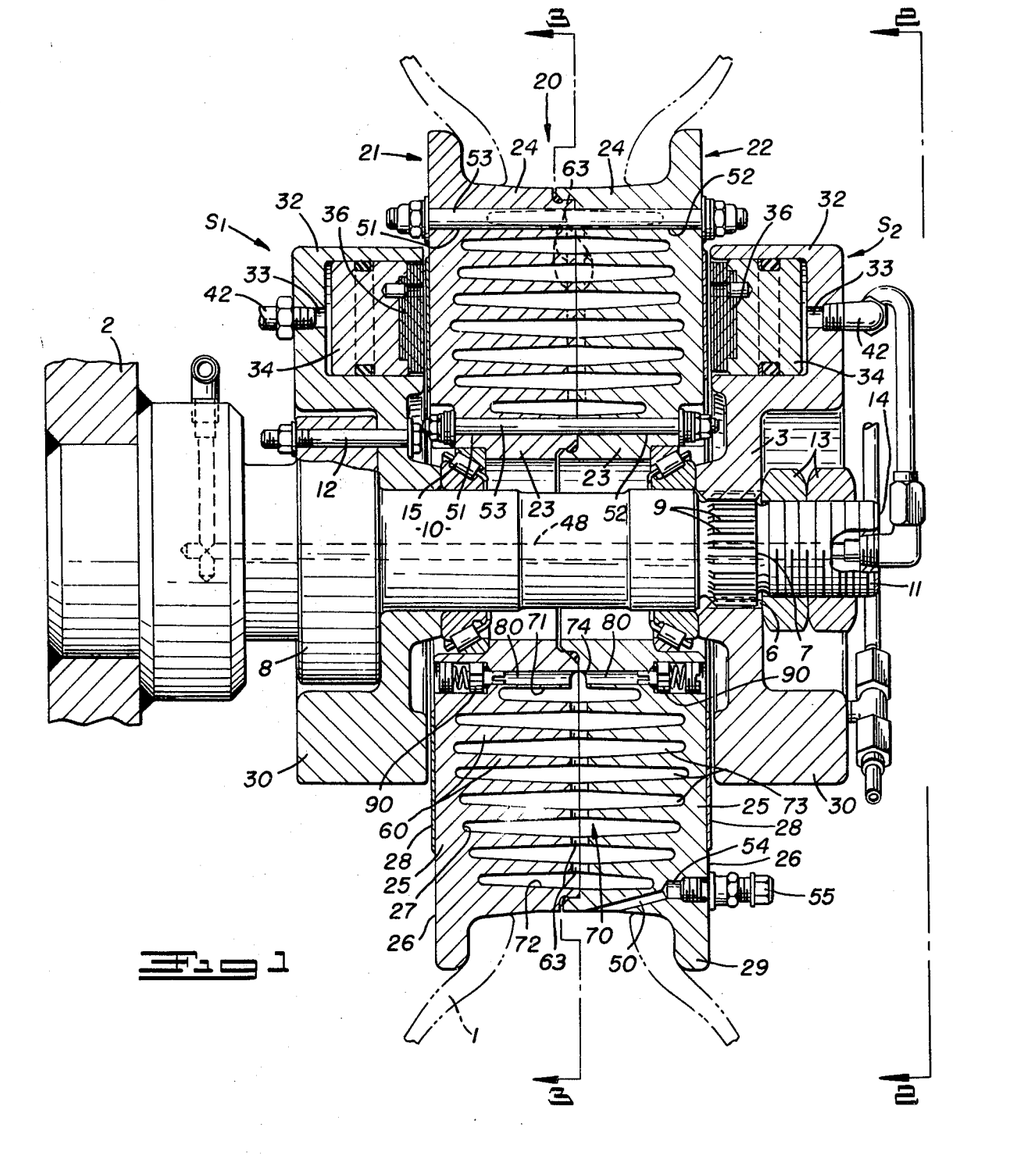
FIG. 1 shows an axial section through a wheel and brake assembly, according to the present invention, with parts omitted and broken away, the section being taken along lines 1—1 of FIG. 2.
Figure 2:
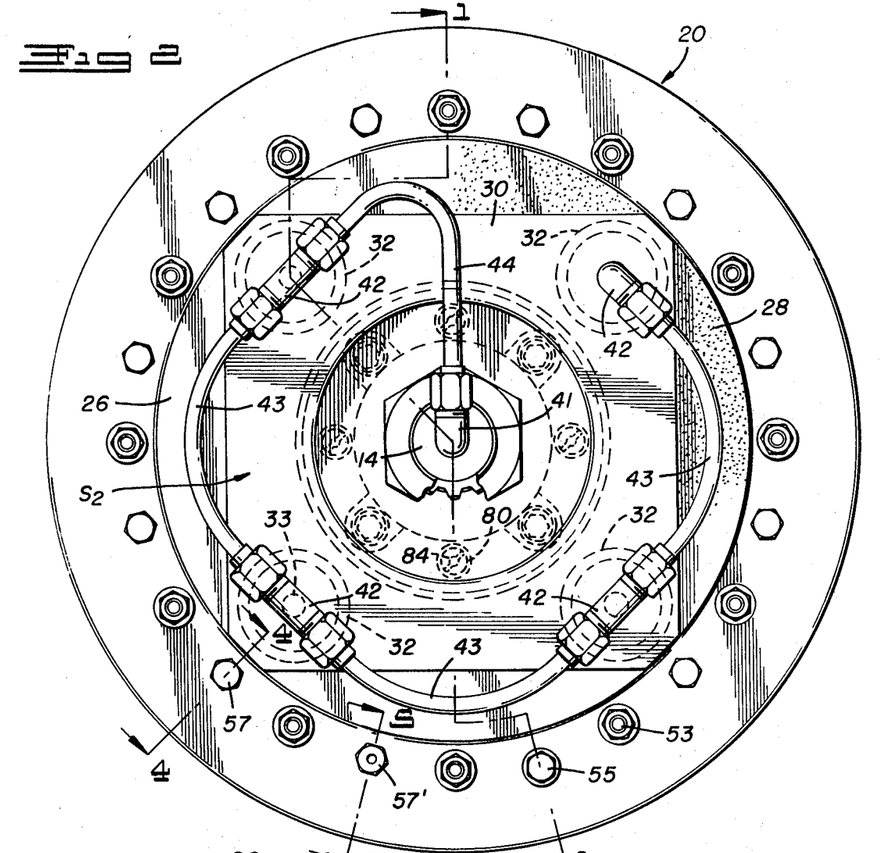
FIG. 2 is an elevation of the outboard side of the wheel and brake assembly, the view taken along lines 2—2 in FIG. 1.
Figure 3:
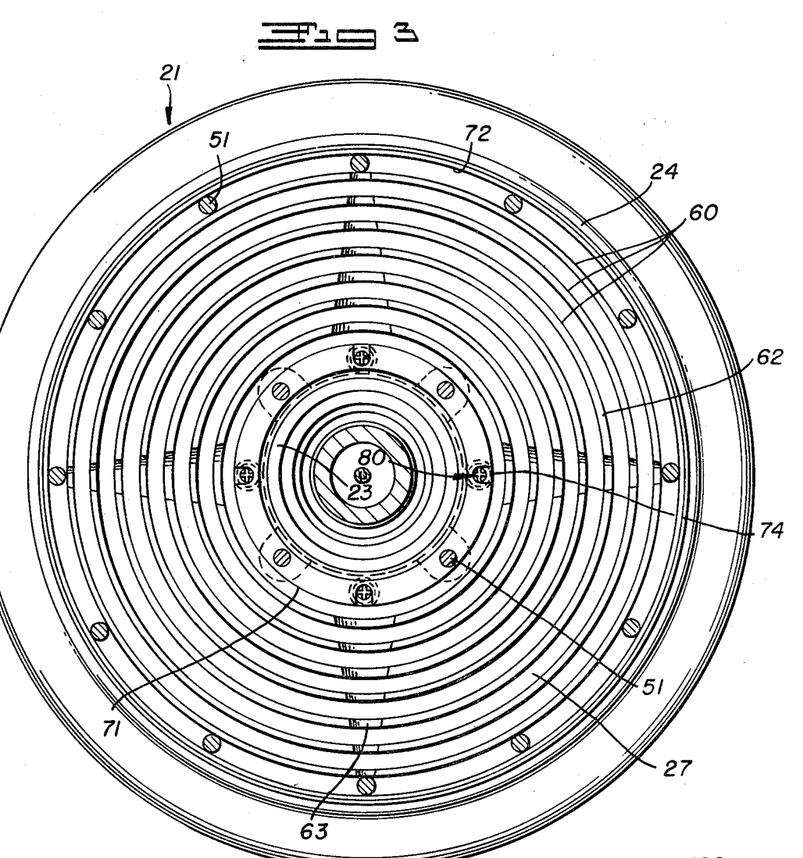
FIG. 3 is a sectional view taken along the lines 3—3 of the assembly shown in FIG. 1.

One of the embodiments of the invention is particularly shown in FIGS. 1 through 9. As seen in FIGS. 1, 2 and 3 a tubular, non-rotatable, support axle or spindle 10 is shown mounted in cantilever fashion to a supporting member 2. The support member 2 may, for example, form part of a strut attached to an aircraft (not shown). The outside diameter of the support axle 10 varies at selected portions along its length in order to adequately support unequal load concentration along the length of the axle.

An "inboard" brake stator S1, a combination wheel and brake rotor member 20, and an "outboard" brake stator S2 are mounted in axially spaced relationship on the axle 10.

The inboard stator S1 is attached to an enlarged portion 8 of the axle 10 by bolts 12. The outboard stator S2 has a hub portion 3 defining a central opening provided with axially extending grooves 6. The axle 10 contains a portion 7, provided with axially extending teeth 9. The stator S2 is placed on the axle 10 so that the grooves 6 engage the teeth 9 and is thereby prevented from rotating about axle 10. Axial movement of the stator S2 along the axle 10 is prevented by proper securing means such as nuts 13 on a threaded portion 11 of the axle. The combination wheel and rotor member 20 is mounted for rotation on the axle 10, between the stators S1 and S2, on a pair of axially spaced roller bearing assembles 15. Depending upon the requirements of a particular situation, suitable alternative means may be used to mount the stators S1 and S2 and the wheel and rotor member 20 in operative relation on the axle, without departing from the scope of the invention.

Each brake stator member, as seen in FIG. 1, 2, 8 and 9, comprises a substantially rectangular, power plate 30 containing a brake cylinder 32 in each of its four corners. An opening 33 is provided in the outer wall of each cylinder 32. The opening 33 is threaded to receive a fitting 42 for conducting fluid to and from the cylinder 32.

As shown more clearly in FIG. 2, three of fittings 42 in the stator S2 are to be T-shaped while the remaining one is L-shaped. Each cylinder 32 is associated with an adjacent cylinder by a tubular conduit 43, with a selected cylinder being connected by a tubular conduit 44 to the inside of tubular axle 10 through an L-shaped fitting 41 in an axle end plate 14.

The inboard stator S1 is in fluid associated with the outboard stator S2 through a conduit 48 which passes through axle 10 and is connected to the fitting 41. The stator S1 is provided with tubular conduits and fittings (not shown) which are arranged similar to those provided for stator S2 and both stator fluid networks are connectable to a common fluid supply (not shown). The particular arrangement of conduits and fittings shown forms no part of the instant invention, and any desired arrangement may be used to most expeditiously supply fluid to each brake cylinder 32.

Mounted within each cylinder 32 is a piston 34 provided with an annular seat 35 for an O-ring 31. Since each stator is connected with the other as described above, and also, since the cylinders of each stator are interconnected, fluid fed from a single fluid source will serve to actuate all the brake pistons, both inboard and outboard, simultaneously.

Each piston 34 is mounted for axial movement within a cylinder 32. A suitable pressurized fluid entering each cylinder 32 will move each piston 34 axially inwardly toward the wheel and rotor member 20. Upon release of fluid pressure, suitable means such as a return spring (not shown) operates to return each piston to provide running clearance between stators S1 and S2 and the wheel and rotor member 20.

Each brake piston 34 is provided with a friction pad or lining 36. The friction pads 36 are secured to the piston 34 by a pair of dowel pins 39. To minimize heat transfer to the stator structure, it is preferred that the pads 36 be made of a material having high thermal resistance. Many commerciallly available types of lining material have proven satisfactory (e.g. lining material sold under the tradename Raybestos 1492–4XS).

The wheel and rotor member 20, shown in FIGS. 1, 2 and 3 is a two-part construction, comprising an outboard wheel segment 22 and an inboard wheel segment 21. The segments are substantially identical and formed of a forged or cast light-weight metal having high heat conducting capability, as for example, aluminum or magnesium. Each wheel segment has a radially inward hub portion 23 and a radially outward rim portion 24 integrally connected by a radially extending annular wall 25. Each segment wall 25 has an outer surface 26, contained in a plane normal to the axis of the segment, which carries a radially extending, annular layer 28 of suitable friction material to be engaged by the plurality of brake pads 36 of one of the stator members S1 or S2. Each wall 25 varies in thickness due to an irregular inner surface 27 opposite each outer surface 26. It is preferred that the axial thickness of each wall 25 be a minimum throughout that portion which carries the annular brake lining 28.

The wheel segments 21 and 22 join to form the composite wheel and rotor member 20 with the hub portion 23 and rim portion 24 of each segment meeting in the plane of the circumferential center-line of the wheel. The spaced sidewalls 25 will thus serve as a disc-brake rotor for cooperation with stators S1 and S2.

The outboard wheel segment 22 has a plurality of annularly disposed, axially extending openings 52 adjacent both its rim portion 24 and hub portion 23 each of which align with one of a pluarity similarly located openings 51 in the inboard wheel segment 21. Tie rods 53 secure the wheel segment 21 and 22 to each other through the pairs of aligned openings 51 and 52.

The wheel segments 21 and 22, connected by the radially inner and outer pluralities of tie rods 53, enclose an annular, endless fluid chamber designated generally as 70 in FIG. 1. The axial length of the chamber 70 is defined by each irregular surface 27 of each segment side wall 25, while its radial length is defined by radially inner and output surfaces 71 and 72 formed by the mating of the hub portions 23 and rim portions 24 of each wheel segment.

The chamber 70 is divided into a plurality of radially spaced, substantially concentric, annular sub-chambers 73. The sub-chambers 73 are formed by a plurality of radially spaced, annular, axially extending fins 60 integral with and extending from the inside surface 27 of each segment wall 25. Each annular fin 60 extends to approximately the axial mid-point of the chamber and is radially disposed with respect to the side wall 25 from which it extends so as to meet a similarly positioned fin extending from the opposing side wall.

As seen in FIG. 3 certain portions of each annular edge 62 of the fins 60 are cut away. The cut away portions 63 are aligned along spaced radii of the wheel segment 21. The fin extensions of wheel segment 22 also have similarly disposed portions 63 cut from the annular edges thereof. Thus, when the segments 21 and 22 are joined to form the wheel assembly 20, the cut away portions 63 in each segment meet to form annularly spaced, radially extending passages through the plurality of sub-chambers 73. The annular length of the cut away portions 63 of each fin depends upon that fin's radial position in the chamber 70. As seen in FIG. 3, the portions 63 become progressively larger from fin to fin from the rim portion of the wheel inwardly toward the hub portion. Thus, the spaced radial passages connecting sub-chambers in the chamber 70, in effect, "diverge" from the outer wall 72 of the chamber 70 toward the inner wall 71.

Each wheel segment 21 and 22 is provided with a plurality of annularly disposed, axially extending, fluid relief passages 80 adjacent its hub portion 23, which are operable to release fluid from the chamber 70 to the atmosphere. Each passage 80 extends from the wall outer surface 26 through each segment wall 25 and registers with the fluid chamber 70 through an opening 74 in the radially inner wall 71 of the chamber.

Figure 6:
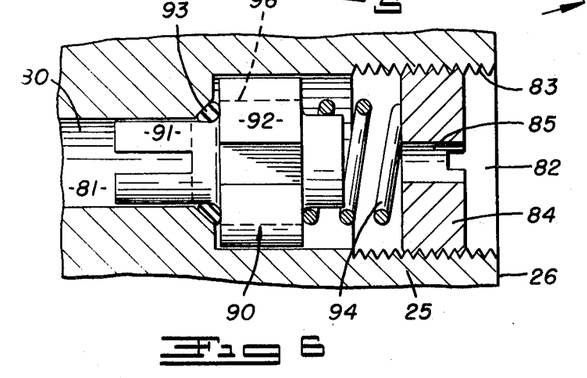
FIG. 6 is an enlarged view of one of the pressure relief means for the liquid chamber with parts omitted, shown in section and broken away.
Figure 7:
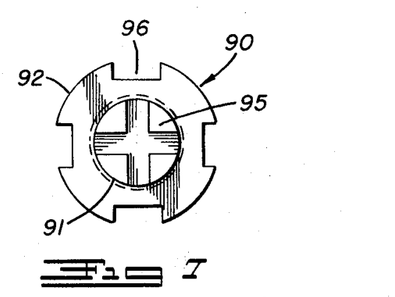
FIG. 7 is an end view of the valve member which forms part of the pressure relief means shown in FIG. 6.

Referring particularly to FIGS. 6 and 7, the relief passages 80 include an inner portion 81 of relatively small diameter and a larger diameter portion 82. A control element or valve 90 has a small diameter portion 91 and a larger diameter portion 92, axially movable within the smaller and larger diameter portions 81 and 82, respectively, of the relief passage 80. In the passage 80, where the smaller diameter portion 81 changes to the larger diameter portion 82, an O-ring seal 93 is provided.

The surface of an axial outer portion of the passage 80 is threaded as shown at 83. A threaded retaining nut 84 is secured within the threaded portions 83. A spring 94 is positioned between the retaining nut 84 and the valve 90 which functions to bias the valve element 90 axially inwardly by a predetermined force to seal the chamber 70 from the atmosphere.

The outer surfaces of the valve portions 91 and 92 are provided with axially extending passages 95 and 96, respectively. The retaining nut 84 is also provided with a passage 85.

Fluid in the chamber 70 will correspondingly fill the passages 95 and exert pressure upon the larger diameter portion 92 of the valve 90. When the fluid pressure exceeds the opposing force of spring 94 the valve element 90 will move axially outwardly in the passage 80. Fluid will then by-pass the O-ring 93 and flow through passages 96 and be released to atmosphere through the passage 85 in the retaining nut 84. After a sufficient volume of fluid is released to lower the pressure within the chamber 70, the spring 94 will return the valve 90 to its sealing position.

As seen in FIG. 1, the radial wall 25 of each wheel segment extends outwardly to form an annular rim flange 29 so that the wheel member 20 is adapted to support a pneumatic tire 1 (shown in phantom outline in FIG. 1). An air passage 50 is provided in the outboard wheel segment 22 for inflating the tire 1 mounted on the wheel member 20. The air passage 50 is associated with a threaded opening 54 in the segment wall 25 in which is secured an air valve assembly 55. As seen in FIG. 2 the position of the air valve assembly 55 is in annular alignment with the plurality of radially outwardly positioned tie rods 53. The particular disposition of the air valve assembly 55 and the air passages 50 is not critical to the instant invention. The air passage with its connecting air valve should be positioned so as to be easily accessable. For example, it might be desirable to inflate the tire 1 from the inboard side of the wheel member 20. If so, the passage 50 with the air valve assembly 55 should be located in the inboard segment 21.

Figure 4:
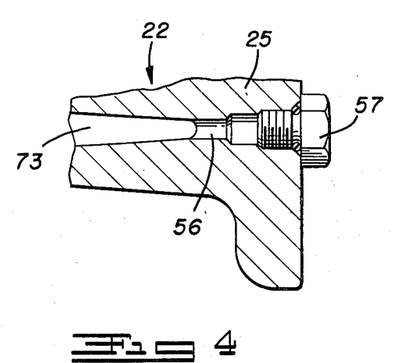
FIG. 4 is a detailed partial section view along lines 4—4 of FIG. 2.

For supplying liquid to or removing liquid from the chamber 70, a plurality of short passages 56 are provided in the sidewall 25 of outboard wheel segment 22. The passages 56 open into the radial outermost annular sub-chamber 73 of the chamber 70 and are adapted to receive threaded plug member 57 as shown in FIG. 4. Again, the particular disposition of the passages 53 does not form a part of the instant invention and, therefore, accessability may dictate a more desirable alternative location for these passages.

Figure 5:
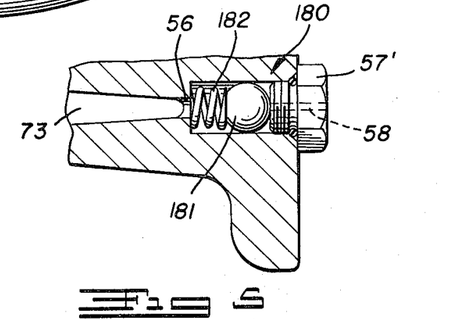
FIG. 5 is a detailed partial section view taken along lines 5—5 of FIG. 2.

In certain circumstances, a selected one of these passages 53 may be modified so as to include a specially designed plug assembly 180 as seen in FIG. 5.

The plug assembly 180 includes a threaded plug 57' which contains a longitudinal opening 58 therethrough. Seated against the end of the opening 58 is a ball 181. The ball is held against the end of the plug 57 by a spring 182.

When the wheel comes to a stop, unreleased vapor within the chamber condenses as it cools, and a vacuum forms within the chamber 70. Depending upon the degree of condensation, the resulting vacuum may be sometimes undesirable. The specially designed plug assembly 180 will serve to relieve such a situation. When a predetermined pressure differential is reached, the ball 181 will move against the spring to admit atmospheric air through the opening 58 and into the chamber 70 thereby filling the vacuum created by vapor condensation.

When the wheel segments 21 and 22 as seen in FIG. 1 are connected, the resultant wheel and rotor structure 20 features a rim portion which is integral with the remainder of the wheel. It might be desirable, however, to modify the structure of FIGS. 1 through 3 so that the rim portion may be detached from the rest of the wheel. Such a modification is illustrated in FIGS. 10 through 13.

Figure 10:
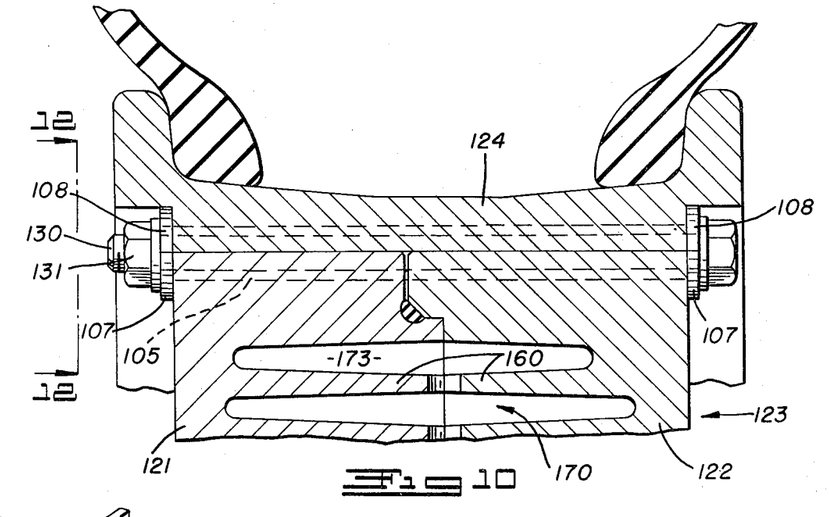
FIG. 10 is a partial elevation view of a modified wheel and brake rotor member, according to the invention, with parts shown in section and broken away, wherein the rim portion of the wheel is made detachable from the brake rotor portion.
Figure 11:
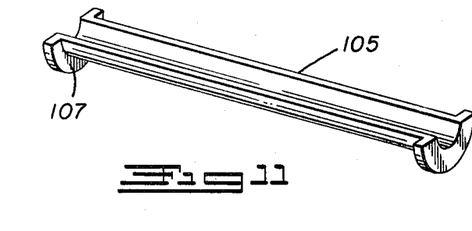
FIG. 11 is a perspective view showing the construction of one of the elements used to mount the detachable rim illustrated in FIG. 10.
Figure 12:
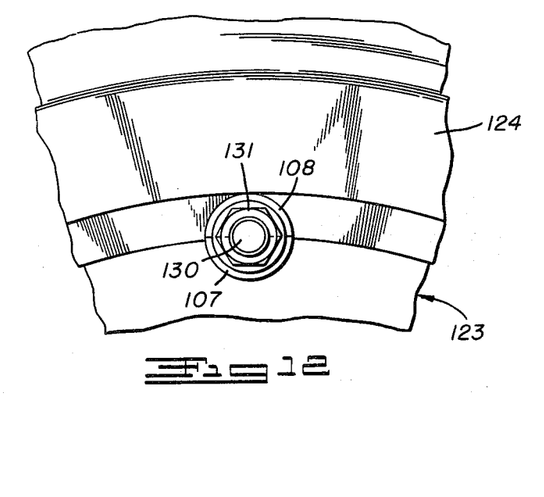
FIG. 12 is a view along lines 12—12 in FIG. 10.

The wheel assembly comprises a rotor portion 123, composed of two rotor segments 122 (outboard) and 121 (inboard), and a separable rim portion 124 connected to the periphery of rotor portion 123.

The rotor segments 122 and 121 enclose a liquid chamber 170, which includes fins 160 and sub-chambers 173. For all practical purposes, the rotor portion 123 is considered structurally identical to the wheel member 20 in FIGS. 1 through 3, except that it does not include an outer integral rim portion.

Figure 13:
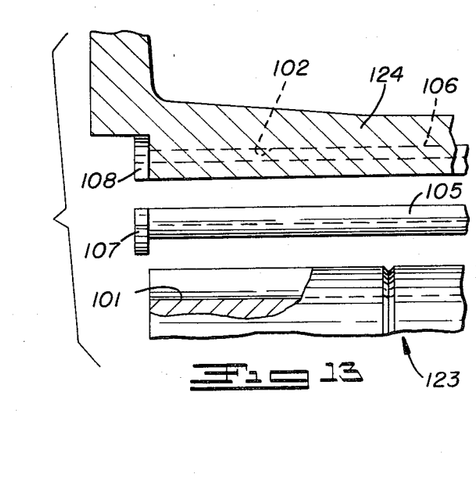
FIG. 13 is a partially disassembled view of the modification of FIGS. 11 and 12, once again illustrating the detachability of the rim portion from the rotor portion of the wheel.

The outer periphery of the rotor portion 123 is provided with a plurality of circumferentially spaced, axially extending grooves 101 (see FIG. 13). Each groove is adapted to receive an elongated channel member 105 having a flange 107 at each end.

The inner surface of the rim portion 124 has a plurality of circumferentially spaced, axially extending grooves 102 which correspond to the grooves 101 in rotor portion 123. The grooves 102 are adapted to receive a channel member 106 similar to channel member 105. Channel member 106 is also provided with a flange 108 at each end.

The rim portion 124 and rotor portion 123 are connected, with a channel member 106 and 105 situated in each groove 102 and 101 respectively (see FIG. 10). Each of the channel members 102 meet a corresponding channel member 101 to form a series of axially extending tubular passages connecting the rim and rotor portions of the wheel. A bolt 130, provided with a nut 131 extends through each tubular passage formed by each pair of channel members 105 and 106. The head 132 of bolt 130 bears against a conjugate pair of end flanges 101 and 107, while the nut 131 is tightened down against the opposite end flanges. The rim portion 124 is thus secured to the rotor portion 123.

Figure 14:
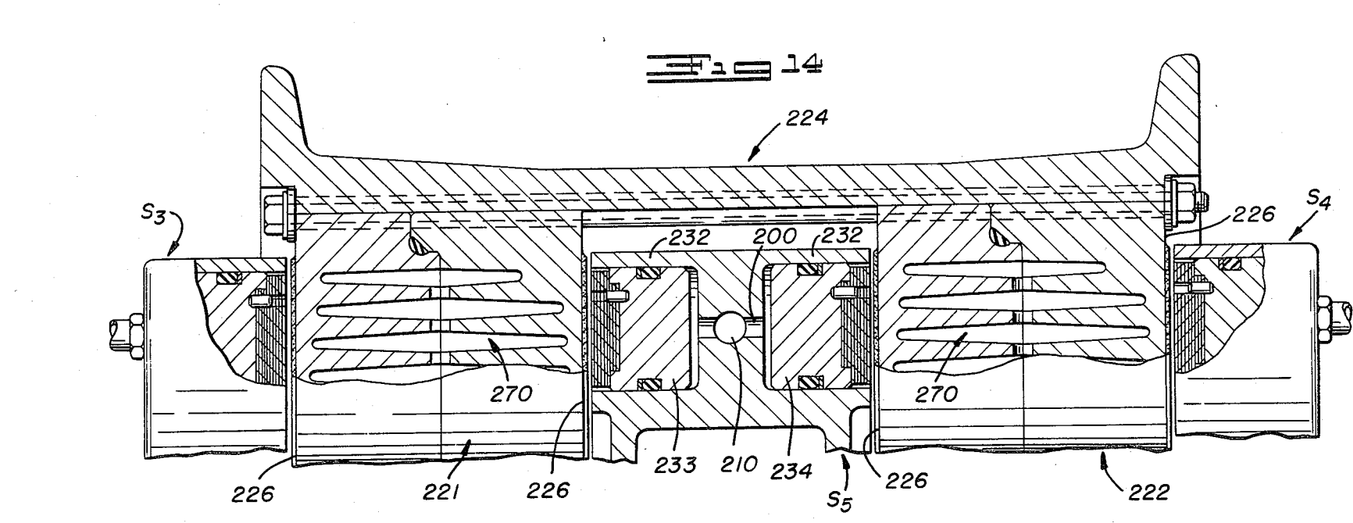
FIG. 14 is another modification of the wheel and rotor combination illustrating the use of two rotor portions with cooling chambers supporting a detachable rim.

The modification shown in FIG. 14 shows the invention as it may be adapted to larger wheel assemblies. A large detachable rim portion 224 is shown supported by a pair of axially spaced rotor members 221 and 222. Each rotor member is of a two-part construction as in the embodiment shown in FIGURES 10 through 13. Each rotor member encloses a chamber 270 of a construction similar to the chamber 70 in FIG. 1. The rotor members are rotatably supported on an axle (not shown) in a manner as heretofore described in relation to the embodiment of FIG. 1 through 9. It is understood that the rotor members 221 and 222 with their enclosed chambers are to have various fluid passages and tie rods associated therewith similar to those illustrated in FIGS. 1 through 9. For the sake of clarity, these passages and tie rods are omitted from FIG. 14.

Each rotor member 221 and 222 has a pair of axially spaced side walls each having an outer surface 226 for cooperation with a brake stator member. Each surface 226 is provided with an annular friction layer (not shown) similar to layer 28 shown in FIGURES 1 and 2.

An outboard brake stator member S4 is positioned to cooperate with the axial outer surface 226 of rotor member 222. An inboard stator member S3 is positioned to cooperate with the axial outer surface 226 of rotor member 221. The stator members S3 and S4 are each provided with brake-pad, piston and cylinder assemblies similar to those carried by stators S1 and S2 shown in FIGS. 1 and 2. In fact, for purposes of the embodiment of FIG. 14, the stators S3 and S4 can be structurally identical to stators S1 and S2, respectively, as shown in FIGS. 1 and 2.

A "double-action" stator member S5 is mounted between the rotor members 221 and 222. The stator member S5 is provided with a plurality of annularly spaced cylinders on each side thereof. The plurality of cylinders 232 on one side of the stator S5 are provided with pistons 234 adapted to cooperate with the axial inner surface 226 of rotor member 222 while the cylinders 232 on the other side of stator S5 are provided with pistons 233 which are to cooperate with the axial inner surface 226 of rotor member 221. Opposite pairs of pistons 232 are associated with a common conduit 200 connected to a main fluid conduit 210.

Figure 8:
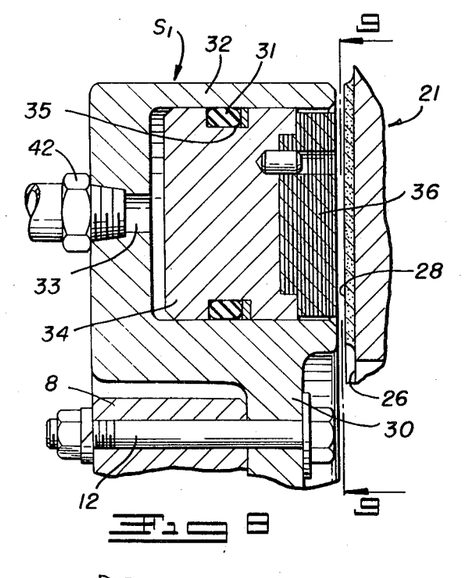
FIG. 8 is an enlarged view of a portion of the inboard stator member, with parts omitted, shown in section and broken away.
Figure 9:
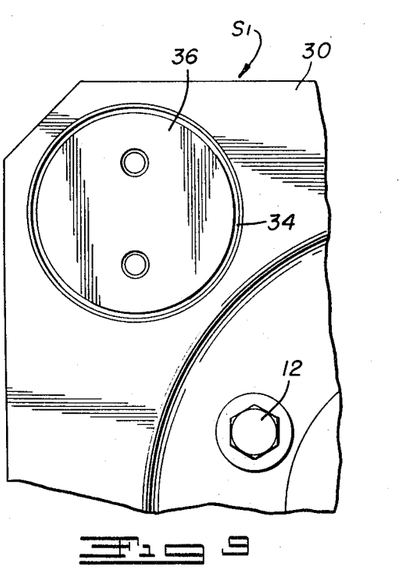
FIG. 9 is a view taken along lines 9—9 of FIG. 8.

All the pistons carried in each stator S3, S4 and S5 are provided with a braking pad 236 similar to the braking pad 36 shown in FIG. 8.

Although not particularly shown in FIG. 14, each stator S3, S4 and S5 is provided with a suitable network of conduits and fittings to provide piston actuating fluid to each brake cylinder simultaneously. The conduits and fittings for each stator member are ultimately connectable to a single fluid supply (not shown). Since the particular details of the conduits and fittings associated with each stator form no part of the instant invention, these details have been omitted for the sake of clarity.

The detachable rim portion 224 in FIG. 14 is attached to both rotor members 221 and 222 using the same type of channel member and bolt arrangement described in relation to the embodiment illustrated in FIGS. 10 through 13.

Having described the structural details of the several embodiments of the invention, a description of the operation of wheel and disc-brake assemblies in relation to these embodiments may serve as a further clarification of these details. The operational description which follows is directed to the invention used as an aircraft wheel. The conceptual aspects of the description would be equally applicable if the invention is used other than as an aircraft wheel.

Referring particularly to the embodiment illustrated in FIGS. 1 through 9, the chamber 70 enclosed within the wheel and rotor member 20 may be supplied with liquid through any one of a selected number of the passages 56. Liquid may be supplied through some type of funnel arrangement placed in the outer ends of the passages or, or if desired, the passages 56 may be adapted for connection with "quick-connect" fluid supply hoses.

The amount of liquid supplied to the chamber 70 is dependent upon the amount of heat expected to develop in the wheels, the next time the brakes are to be used during a landing. Therefore, the chamber 70 may be completely filled, partially filled or even empty during a particular landing. For purposes of this operational description it is assumed the chamber is filled to about three-fourths of its capacity.

The most common liquid used is water. However, it may be desirable to use different liquids which are found more suitable due to particular conditions. For example, changes in ambient temperatures may require use of some type of eutectic mixture.

The wheel and rotor member 20, as it engages the ground begins rotating. As it rotates, the liquid within will tend to move toward the radial outer portion of the annular chamber 70 due to centrifugal force. When the brakes are applied, the pistons 34 move axially inwardly and engage the annular layers of friction material 28 on each outer surface 26 of the walls 25. Heat developed due to the braking action will be transferred through the walls 25, through the fins 60 in the annular chamber 70, and be ultimately absorbed by the water in the outer portion of the chamber 70. If enough heat is absorbed by this liquid, a portion of the liquid may vaporize and the vapor will "rise" through the column of liquid toward the radial inner portion of the chamber 70. Vapor as well as liquid will circulate through the sub-chamber 73 of the chamber 70, through the "diverging" radial passages formed by the portions 63 cut away from the ends of the fins 60. As the braking action continues, more of the liquid contained in the chamber may vaporize and the pressure caused by this vapor and liquid in the radial inner portion of the chamber 70 gradually increases. When a predetermined fluid pressure is reached each annular plurality of passages 80 in each side wall 25 is opened by axial movement of the valve element 90 against the spring 94 and fluid is released to the atmosphere. As long as the braking action continues, liquid may be continually vaporizing within the chamber 70. As long as the pressure due to vapor and fluid within the chamber 70 is great enough, the valve element 90 will remain open and fluid will be continuously released to the atmosphere. When the wheel 20 comes to rest and/or when the pressure within the chamber 70 drops below the predetermined pressure required to overcome the spring 94, the valve element 90 in each vapor passage 80 returns to a sealing position.

If the liquid within the chamber 70 cools while the wheel 20 is at rest, a vacuum may form within the chamber. As stated previously, this situation might be undesirable if the intensity of this vaccum might adversely affect the structure of the wheel. To alleviate this situation a specially designed plug assembly 180 may be provided in the radial outer portion of the side wall 25 in the wheel segment 22. A pressure differential would exist between the outside of the wheel and inside chamber 70. As this pressure differential reaches a predetermined value, pressure from the outside will force the ball 81 against the spring 82 and outside air will enter the chamber 70 through passages 56 and fill this vacuum.

On the other hand, it might be desirable to operate the wheel and rotor assembly 20 with the chamber 70 in a vacuum condition. This is desirable since the liquid will more easily vaporize under vacuum conditions and heat will be more rapidly taken up through faster vaporization of the liquid. Of course, in this case the special plug assembly 80 will not be used since a vacuum in the chamber 70 is desired.

Liquid placed within the chamber 170 in FIG. 10 will function in the same way to prevent the modified structure of rotor 123 with detachable rim 129 from reaching a critical temperature.

The wheel and disc-brake assembly illustrated in FIG. 14 is also cooled in the same manner described above with the description applicable to each liquid chamber 270 in each of the rotor members 221 and 222.

It has been found that wheel and brake assemblies designed with cooling chambers as herein described are light-weight, compact and can be used in almost every type of landing. If a high energy situation is expected which might result in high temperatures, a sufficient volume of water is added to the assembly and braking temperatures will be maintained below most values considered critical. For example, in the aircraft industry a "bead seat" temperature of about 350° F. is considered the maximum allowable temperature during braking. The "bead seat" temperature of an aircraft wheel is that temperature taken along the annular portion of the rim which contacts directly the bead portion of the tire. Tests have been made on brake and wheel assemblies made according to the instant invention under conditions similar to those which would exist during the landing of an aircraft. The "bead seat" temperature under these conditions has not gone beyond 250° F.

Many obvious modifications may be made with respect to the embodiments specifically covered in the foregoing description. However, such modifications are considered included within the inventive concept evident in that description.

What is claimed is:

1. A combination wheel and disc-brake assembly comprising a rotatable wheel and brake rotor member, said member comprising a central hub portion, a peripheral rim portion radially spaced from said hub portion and at least one brake rotor portion connecting said rim portion to said hub portion, said brake rotor comprising a pair of axially spaced walls extending radially outwardly from said hub portion to said rim portion, each of said walls having an outer annular friction surface contained in a plane substantially normal to the axis of rotation of said member and an inner surface defining one of a pair of sidewalls of an annular, endless, fluid chamber enclosed within said rotor portion, a plurality of substantially concentric annular fins extending axially from each of said walls to approximately the center of said chamber, said fins being radically spaced with respect to each wall such that each fin extending from one of said walls contacts a corresponding fin extending from the opposite wall to thereby divide said chamber into a plurality of radially spaced, annular sub-chambers, fluid inlet means to said chamber adjacent said rim portion, said inlet means comprising an inlet passage through at least one of said walls at the radially outer portion thereof, fluid outlet means from said chamber adjacent said hub portion, said outlet means comprising an outlet passage through at least one of said walls at the radially inner portion thereof, said outlet passage being controlled by a pressure responsive valve operable to release fluid from said chamber upon said fluid reaching a predetermined pressure within said chamber.

2. The assembly as defined in claim 1, further comprising a brake stator operatively associated with said wheel and brake-rotor member, said stator comprising at least one axially movable fluid actuated brake pad for each of said annular friction surfaces of said brake rotor.

3. The assembly as defined in claim 1, whereby each of said sub-chambers is associated with the remaining sub-chambers by a plurality of circumferentially spaced, radial passages, each passage defined by a radially aligned opening in each pair of contacting fins.

4. The assembly as defined in claim 3, further comprising a brake stator operatively associated with said wheel and brake-rotor member, said stator comprising at least one axially movable, fluid actuated brake pad for each of said annular friction surfaces of said brake rotor.

References Cited
UNITED STATES PATENTS 2,254,074   8/1941   Klaue.

FOREIGN PATENTS 999,870   10/1951   France.
653,565    5/1951   Great Britain.
701,725   12/1953   Great Britain.

GEORGE E. A. HALVOSA, Primary Examiner

U.S. Cl. X.R.

192—113

PO-1050
(5/69)

UNITED STATES PATENT OFFICE
CERTIFICATE OF CORRECTION

Patent No. 3,516,522      Dated June 23, 1970

Inventor(s) Richard K. Chamberlain

It is certified that error appears in the above-identified patent and that said Letters Patent are hereby corrected as shown below:

Column 2, line 13, the word "ssytem" should be -- system --.

Column 4, line 70, the word "commerciallly" should be -- commercially --.

Column 5, line 25, the word "pluarity" should be -- plurality --; Line 35, the word "output" should be -- outer --.

Column 7, line 42, the phrase "flanges 101 and 107" should be -- flanges 108 and 107 --.

Column 8, lines 45 and 46, the phrase "or, or if desired" should be -- or, if desired --.

Column 10, line 12, the phrase "brake rotor" should be -- brake rotor portion --; Line 22, the word "radically" should be -- radially --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents